(12) United States Patent
Liang et al.

(10) Patent No.: US 7,490,809 B2
(45) Date of Patent: *Feb. 17, 2009

(54) STAND FOR RETAINING COMPUTER CHASSIS

(75) Inventors: Chun-Chi Liang, Tu-Cheng (TW); Guang-Yao Lee, Tu-Cheng (TW); Pin-Shian Wu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 40 days.

This patent is subject to a terminal disclaimer.

(21) Appl. No.: 11/395,600

(22) Filed: Mar. 31, 2006

(65) Prior Publication Data

US 2006/0289719 A1    Dec. 28, 2006

(30) Foreign Application Priority Data

Jun. 22, 2005    (CN)    ............... 2005 2 0060522 U

(51) Int. Cl.
F16M 3/00    (2006.01)
(52) U.S. Cl. .................. 248/676; 248/146; 248/175; 248/346.03; 248/918
(58) Field of Classification Search .......... 248/146, 248/346.01, 676, 678, 175, 176.3, 346.03, 248/284.1, 291.1, 292.12, 918; 403/62, 65, 403/73, 113, 116, 117, 119, 150, 330; 297/16.1, 297/DIG. 11; 312/223.2; 361/679, 683
See application file for complete search history.

(56) References Cited

U.S. PATENT DOCUMENTS

| | | | | |
|---|---|---|---|---|
| 3,266,765 A * | 8/1966 | Campbell | .............. | 248/346.04 |
| 3,936,022 A * | 2/1976 | Nicholl | ........................ | 248/137 |
| 4,553,786 A * | 11/1985 | Lockett et al. | ............ | 297/440.1 |
| 4,955,873 A * | 9/1990 | Rajlevsky | .................... | 604/322 |
| 5,507,564 A * | 4/1996 | Huang | .................... | 297/452.13 |
| 5,982,885 A * | 11/1999 | Ho | .............................. | 379/446 |
| 6,311,941 B1 | 11/2001 | Feldmeyer | | |
| 6,344,971 B1 * | 2/2002 | Ju | .............................. | 361/704 |
| 6,364,278 B1 | 4/2002 | Lin et al. | | |
| 6,739,649 B2 * | 5/2004 | Kelly et al. | ................. | 297/16.1 |
| 6,786,461 B1 * | 9/2004 | Tsai et al. | ................. | 248/118.3 |
| 6,802,328 B2 * | 10/2004 | Lin | .............................. | 135/96 |
| 6,892,994 B1 * | 5/2005 | Renshaw | ............... | 248/346.04 |
| 6,902,230 B2 * | 6/2005 | Chen | .......................... | 297/16.1 |
| 6,929,337 B2 * | 8/2005 | Helot et al. | .............. | 312/223.2 |
| 2005/0280999 A1* | 12/2005 | Farrow et al. | ............... | 361/704 |
| 2007/0001085 A1* | 1/2007 | Liang et al. | ................. | 248/678 |

* cited by examiner

Primary Examiner—Korie H. Chan

(57) ABSTRACT

A stand for retaining a computer chassis includes a base frame for supporting the computer chassis, a pair of clamping arms for sandwiching the computer chassis, a pair of pivoting members, and a pair of connecting members. Each of the pivoting members includes a linking portion connected to the corresponding clamping arm, and a pivoting portion including a number of first engaging teeth. Each of the connecting members includes a first connecting portion and a second connecting portion. The first connecting portion is connected to the base frame, and the second connecting portion includes a number of second engaging teeth engaged with the first engaging teeth of the corresponding pivoting member.

18 Claims, 6 Drawing Sheets ion with this patent application.
STAND FOR RETAINING COMPUTER CHASSIS

CROSS-REFERENCE TO RELATED APPLICATION

Related subject matter is disclosed in the co-pending U.S. patent application Ser. No. 11/306,484, filed on Dec. 29, 2005, and having a same title with the present application, and another co-pending U.S. patent application Ser. No. 11/395,610, filed on the same date of this application, Mar. 31, 2006, and having a same title with the present application, which are assigned to the same assignee with this patent application.

BACKGROUND

1. Field of the Invention

The present invention relates to a stand, and particularly to a stand which can freely and stably support computer chassis with different sizes.

2. General Background

Conventional desktop computer enclosures are usually classified as tower computer enclosures and horizontal computer enclosures. Due to a compact size trend of the development of computer enclosures, horizontal computer enclosures are made much thinner than before. To enable a horizontal computer enclosure to stand like a tower computer enclosure, a supporting apparatus, such as a pedestal is needed.

A conventional stand is often secured to a bottom of a computer chassis via a plurality of screws. However, using extra tools to screw or unscrew the screws makes the assembly or disassembly process unduly cumbersome.

Another conventional stand such as disclosed in U.S. Pat. No. 6,364,278, includes two coupled supporting members. Each supporting member includes a dovetail shaped protrusion to couple with a recess of the other supporting member. This structure is simple and readily to be assembled. However, a clamping ledge is integrally formed from each supporting member. Therefore, the stand only engages a part of a lower portion of the computer chassis. When the computer chassis has a great height, the stand may not stably support the computer chassis.

What is desired, therefore, is a stand stably and freely supporting computer chassis with different sizes.

SUMMARY

In one preferred embodiment, a stand for retaining a computer chassis includes a base frame for supporting the computer chassis, a pair of clamping arms for sandwiching the computer chassis, a pair of pivoting members, and a pair of connecting members. Each of the pivoting members includes a linking portion connected to the corresponding clamping arm, and a pivoting portion including a plurality of first engaging teeth. Each of the connecting members includes a first connecting portion and a second connecting portion. The first connecting portion is connected to the base frame, and the second connecting portion includes a plurality of second engaging teeth engaged with the first engaging tth of the corresponding pivoting member.

Other advantages and novel features will become more apparent from the following detailed description of preferred embodiments when taken in conjunction with the accompanying drawings, in which:

DETAILED DESCRIPTION OF THE EMBODIMENTS

Figure 1:
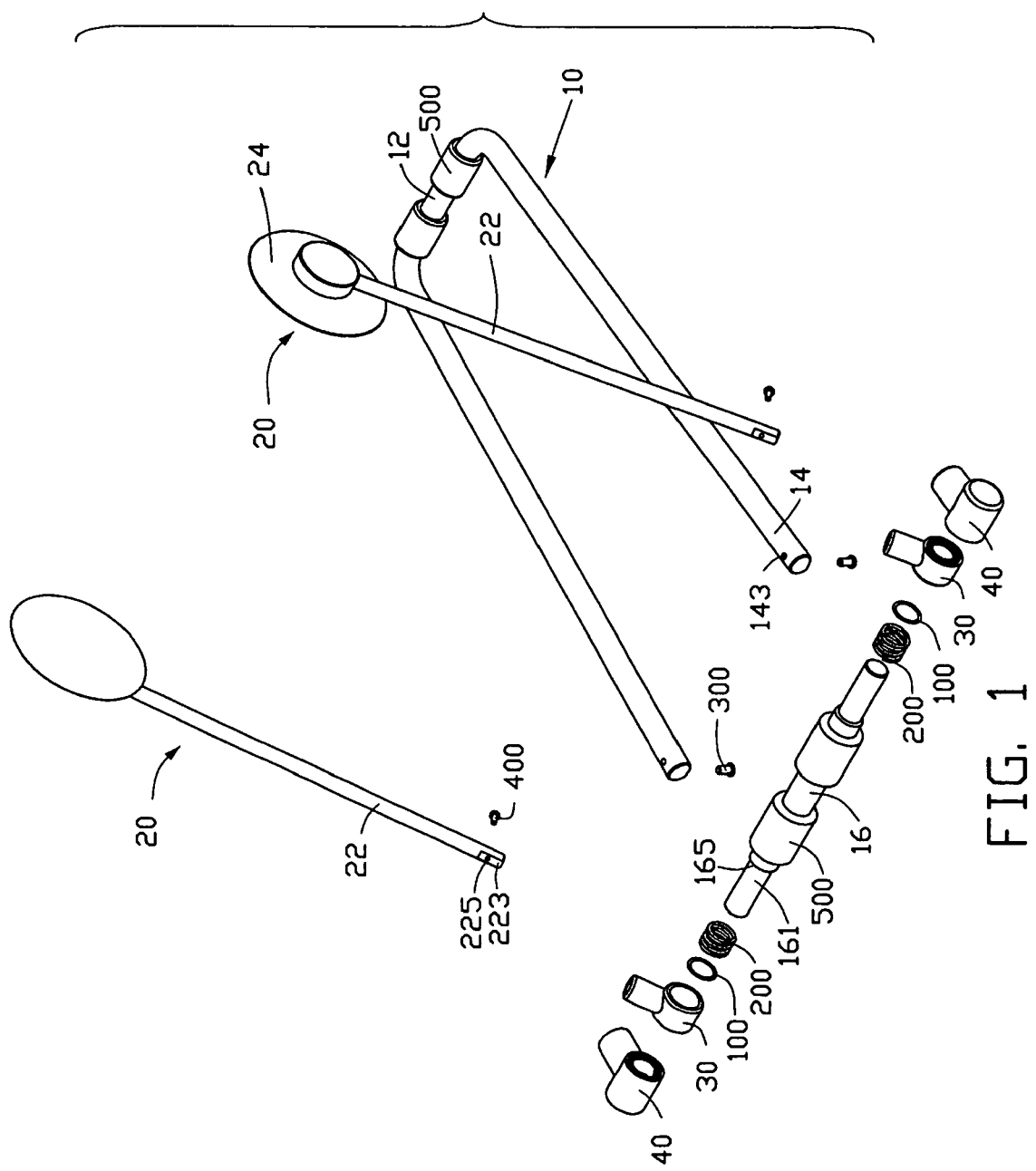
FIG. 1 is an exploded, isometric view of a stand in accordance with a preferred embodiment of the present invention, the stand including a connecting member and a pivoting member.
Figure 2:
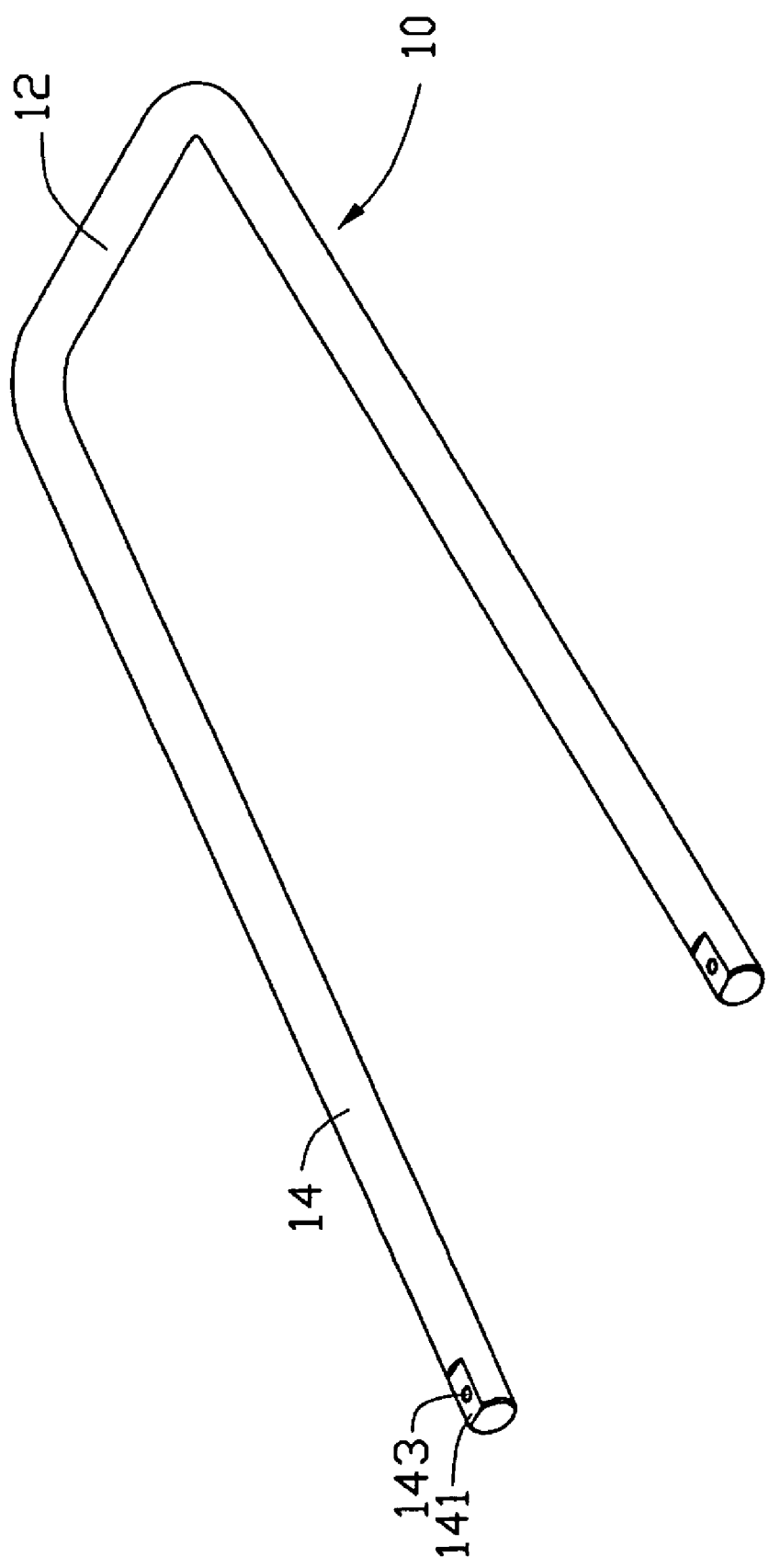
FIG. 2 is an isometric view of a base frame of the stand of FIG. 1.
Figure 6:
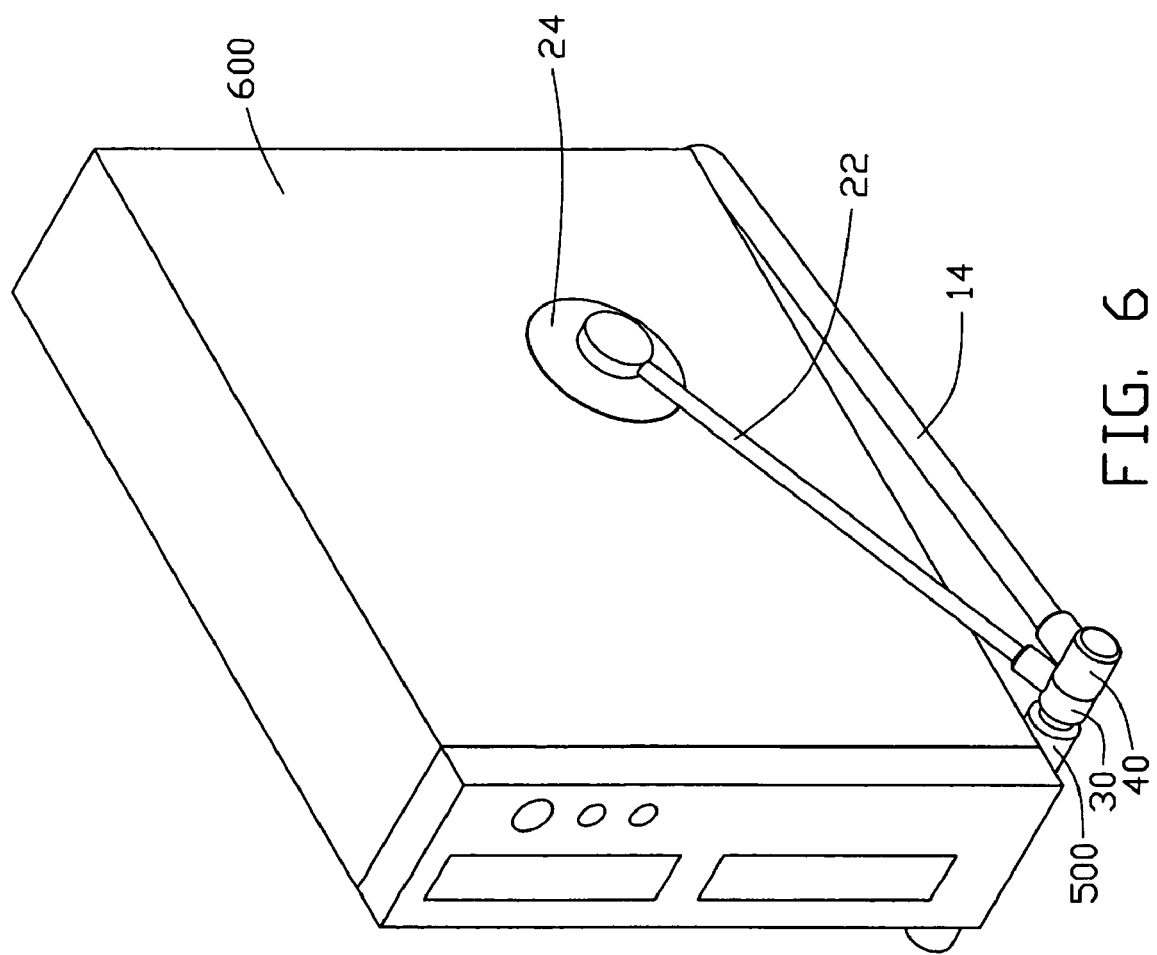
FIG. 6 is an assembled view of FIG. 1, together with a computer chassis.

Referring to FIGS. 1, 2, and 6, a stand in accordance with a preferred embodiment of the present invention supports a computer chassis 600 and includes a base frame 10, a pair of clamping arms 20, a shaft 16, a pair of elastic members 200, a pair of pivoting members 30, and a pair of connecting members 40. The pivoting members 30 are connected with the connecting members 40. The elastic members 200 are placed over the shaft 16, and the shaft 16 is connected to the connecting members 40. The clamping arms 20 are pivotally connected to the base frame 10 via the shaft 16, the pivoting members 30, and the connecting members 40.

The base frame 10 has a U-shaped configuration. The base frame 10 includes a pair of levers 14, and a beam 12. The beam 12 is connected between the two levers 14. A cutout 141 is defined in a free end of each lever 14. A threaded hole 143 is defined in the end of each lever 14, which the cutout 141 is formed in. The shaft 16 includes a stopping portion 165 in a middle thereof and two inserting portions 161 in two ends thereof. A diameter of each of the inserting portion 161 is smaller than that of the stopping portion 165.

Each clamping arm 20 includes a pole 22, and a retaining pad 24 arranged at an end of the pole 22. The retaining pads 24 are for engaging two sides of the computer chassis 600 and sandwich the computer chassis 600 therebetwen. In this preferred embodiment, the retaining pads 24 are circular rubber suckers. A cutout 223 is formed in the other end of each pole 22. A threaded hole 225 is defined in the end of each pole 22, which the cutout 223 is formed in.

A plurality of bushes 500 is separately fixed around the shaft 16 and the beam 12 of the base frame 10. The bushes 500 are made of rubber, for preventing a bottom of the computer chassis 600 being scraped and unwillingly moving on the stand.

Figure 3:
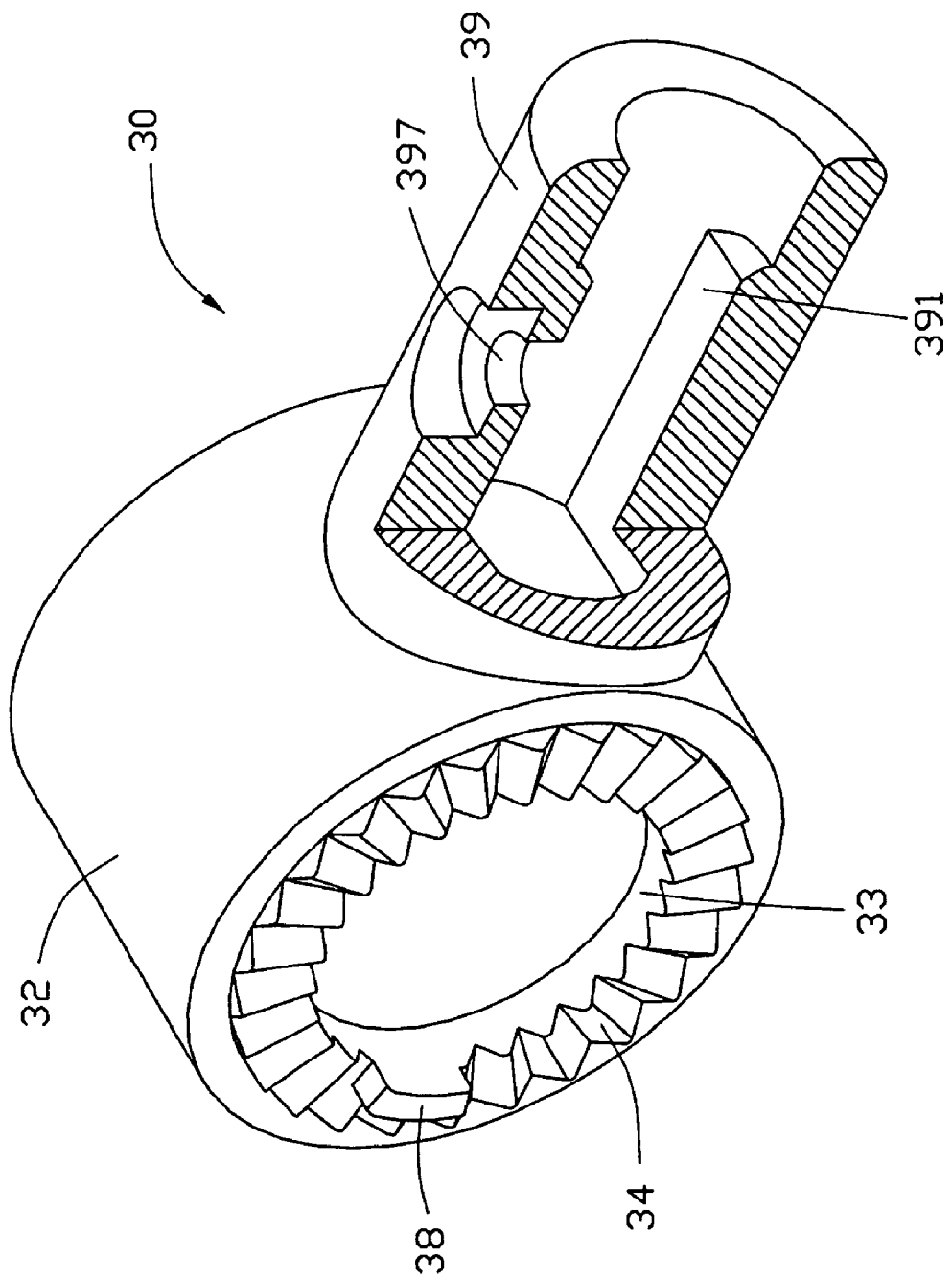
FIGS. 3 and 4 are cross-section views of two different parts of the pivoting member of the stand of FIG. 1 respectively.
Figure 4:
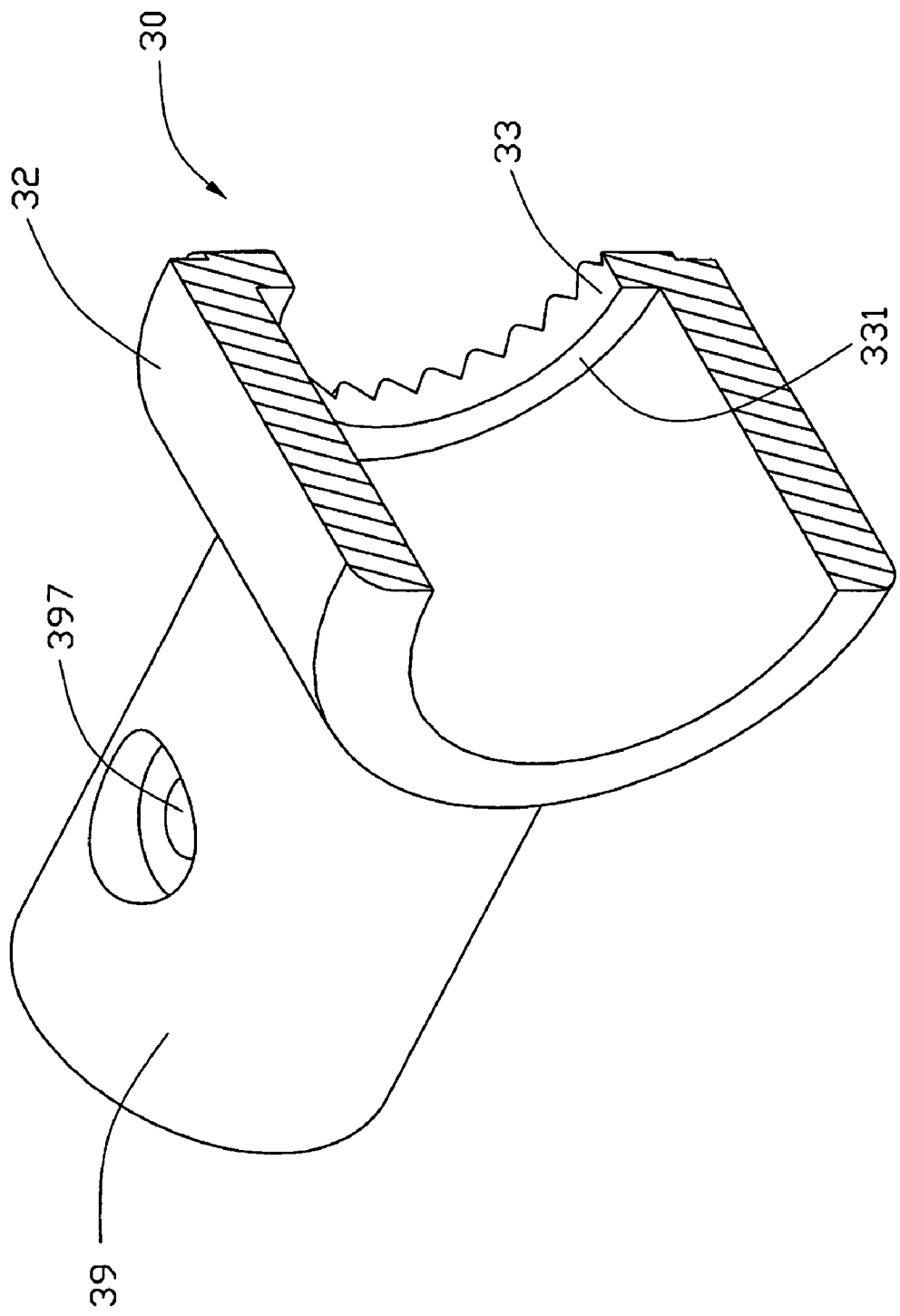

Referring to FIGS. 3 and 4, each pivoting member 30 includes a pivoting portion 32, and a linking portion 39 extending from an outer circumferential surface of the pivoting portion 32. The pivoting portion 32 is a sleeve and the linking portion 39 is a tube. An axis of the sleeve 32 intersects with that of the tube 39. The sleeve 32 includes a protruding portion 33 in an inner sidewall thereof. The protruding portion 33 includes a plurality of first engaging teeth 34 in one end thereof. Each of the first engaging teeth 34 extends in a direction parallel with the axis of the sleeve 32 and projects out of the sleeve 32. Each of the first engaging teeth has a "V" configuration. A limited block 38 is formed in an inner sidewall of the protruding portion 33 and projects out of the sleeve 32. The protruding portion 33 includes an end surface 331 in the other end thereof. The tube 39 includes a block 391 formed in an inner sidewall thereof. A threaded hole 397 is defined in the tube 39.

Figure 5:
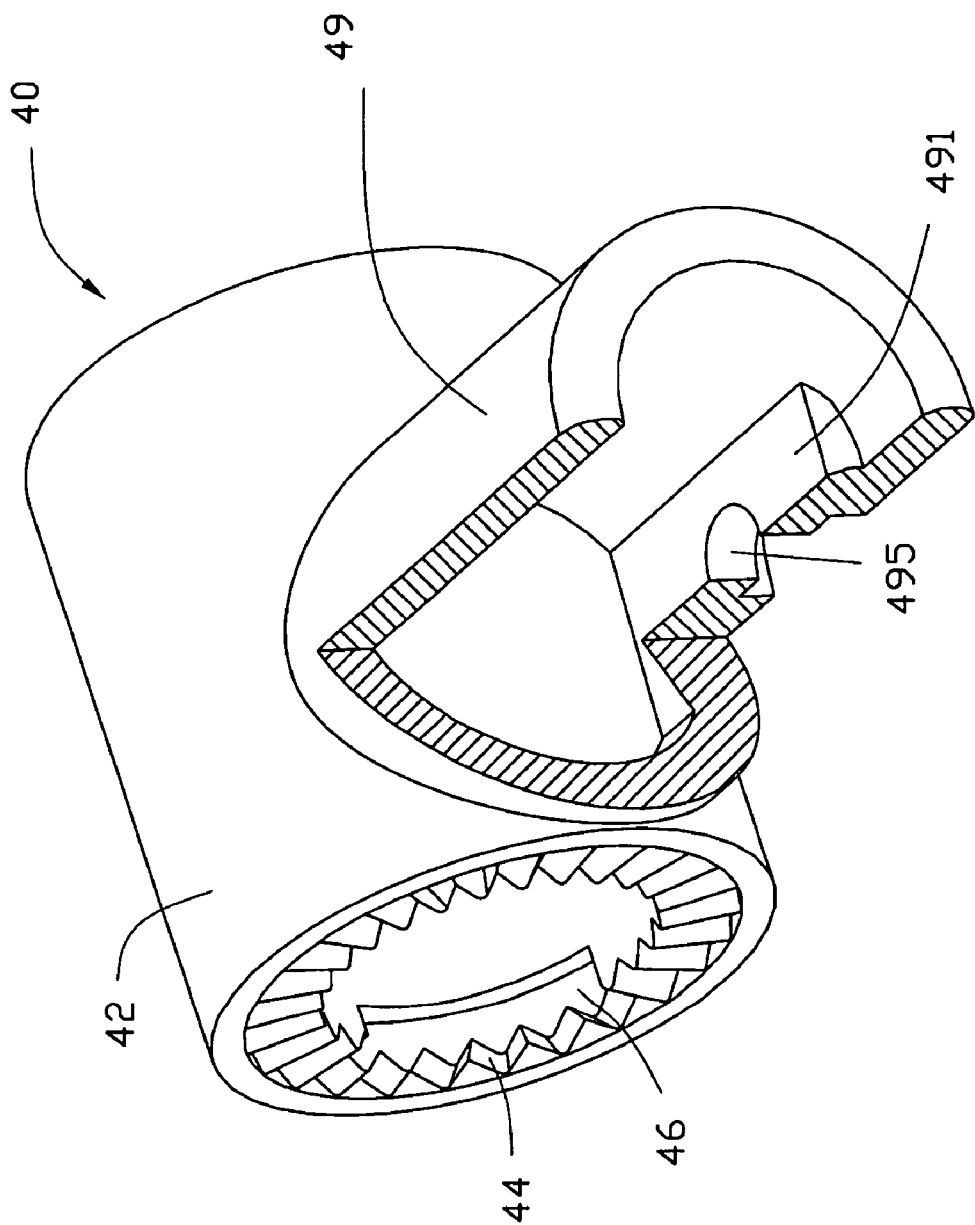
FIG. 5 is a cross-section view of a part of the connecting member.

Referring to FIG. 5, each connecting member 40 includes a first connecting portion 42, and a second connecting portion 49 extending from an outer circumferential surface of the first connecting portion 42. The first connecting portion 42 is a sleeve and the second connecting portion 49 is a tube. An axis of the sleeve 42 intersects with that of the tube 49. The sleeve 42 includes a plurality of second engaging teeth 44 in an inner sidewall thereof. Each of the second engaging teeth 44 extends in a direction parallel with the axis of the sleeve 42. Each of the second engaging teeth 44 has a "V" shape and can be engaged with each of the first engaging teeth 34 of the pivoting member 30. A receiving groove 46 is defined in an inner sidewall of the sleeve 42. The receiving groove 46 can receive the limited block 38 of the pivoting member 30. The tube 49 includes a block 491 formed in an inner sidewall thereof. A threaded hole 495 is defined in the tube 49 and the threaded hole 495 runs through the block 491.

Referring to FIG. 6, in assembly, the limited block 38 of each pivoting member 30 is inserted into the receiving groove 46 of the corresponding pivoting member 40. Each of the first engaging teeth 34 is engaged with the corresponding second engaging tooth 44. Thus, the pivoting member 30 is connected with the corresponding connecting member 40. A gasket 100 is put on the end surface 331 of the protruding portion 33 of the pivoting member 30. The inserting portion 161 of the shaft 16 is inserted into the sleeve 42 of the corresponding connecting member 40. The elastic member 200 is placed over the inserting portion 161 and sandwiched between the gasket 100 and the stopping portion 165. The elastic members 200 are depressed, so the first engaging teeth 34 are securely engaged with the second engaging teeth 44 by an elastic restoring force of the elastic members 200. Ends of the poles 22 of the clamping arms 20 are securely retained in the corresponding tubes 39 of the pivoting members 30 by screws 400 being screwed into the holes 397 of the tubes 39 and the threaded holes 223 of the poles 22. Ends of the levers 14 of the base frame 10 are securely retained in the corresponding tubes 49 of the connecting members 40, by screws 300 being screwed into the holes 495 of the tubes 49 and the threaded holes 143 of the levers 14.

In use, the retaining pads 24 sandwich two sides of the computer chassis 600 therebetween. The beam 12 of the base frame 10 and the shaft 16 support a bottom of the computer chassis 600. The first engaging teeth 34 are detached from the second engaging teeth 44 by pushing the poles 22 until the pivoting members 30 compress the elastic members 200. Then, rotating the clamping arms 20, the limited block 38 of the pivoting member 30 is turned around in the corresponding receiving groove 46. When the clamping arms 20 are rotated to a fit position to retain the computer chassis 600, the poles 22 are released and the first engaging teeth 34 are engaged with the second engaging teeth 44 again because of the elastic restoring force of the elastic members 200. Another operating method is to rotate the clamping arms 20 and the first engaging teeth 34 compel the second teeth 44 to be detached from the first engaging teeth 34. The clamping arms 20 can also be rotated to overlap the base frame 10 when the stand is not used. Therefore, the stand occupies an even less space, which is convenient in transport or in carry.

In addition, the elastic members 200 and the gaskets 100 can be omitted. In assembly, two ends of the levers 14 are draw away from each other, and then, are connected securely to the connecting members 40. The second engaging teeth 44 are engaged with the first engaging teeth 34 by the elastic restoring force of the levers 14. In use, the first engaging teeth 34 are forced to be detached from the second engaging teeth 44 by rotating the clamping arms 20. Then, rotating the clamping arms until the clamping arms 20 reach a suitable position to retain the computer chassis 600, and the first engaging teeth 34 are engaged with the second engaging teeth 44 again by an elastic restoring force of the levers 14.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A stand for retaining a chassis, the stand comprising:
 a base frame for supporting the chassis thereon;
 a pair of clamping arms for sandwiching the chassis therebetween;
 a pair of pivoting members, each of the pivoting members comprising a linking portion and a pivoting portion, the linking portion connected to the corresponding clamping arm, the pivoting portion comprising a plurality of first engaging teeth; and
 a pair of connecting members, each of the connecting members comprising a first connecting portion and a second connecting portion, the first connecting portion connected to the base frame, the second connecting portion comprising a plurality of second engaging teeth engaged with the first engaging teeth of the corresponding pivoting member, wherein each of the pivoting members comprises a limited block, and each of the connecting members comprises a receiving groove, the limited block is inserted into the corresponding receiving groove.

2. The stand as claimed in claim 1, further comprising a shaft for supporting the chassis, wherein two ends of the shaft are received in the second connecting portions of the connecting members.

3. The stand as claimed in claim 2, further comprising a pair of elastic members, wherein each of the elastic members is placed over the shaft and sandwiched between the corresponding pivoting member and the shaft.

4. The stand as claimed in claim 1, wherein the base frame comprises a pair of levers and a beam connecting ends of the levers.

5. The stand as claimed in claim 4, wherein a cutout and a threaded hole are formed in the end of each of the levers, a block is arranged in the first connecting portion of each of the connecting members, and the block is inserted into the cutout and prevents each of the levers rotating in the first connecting portion.

6. The stand as claimed in claim 1, wherein each of the clamping arms comprises a pole and a retaining pad arranged at one end of the pole, the retaining pads are adapted for sandwiching the chassis therebetween, and the other end of the pole is attached to the linking portion of the corresponding pivoting member.

7. The stand as claimed in claim 6, wherein a cutout and a threaded hole are formed in the other end of the pole, a block is arranged in the linking portion of each of the pivoting members, and the block is inserted into the cutout and prevents the clamping arm rotating in the linking portion.

8. A stand for retaining a chassis, the stand comprising:
 a base frame for supporting the chassis, the base frame comprising a pair of levers and a shaft connected to the levers;

a pair of clamping arms for sandwiching the chassis therebetween;

a pair of pivoting members, each of the pivoting members comprising a linking portion and a pivoting portion, the linking portion connected to the corresponding clamping arm, the pivoting portion comprising a first engaging tooth; and a pair of connecting members, each of the connecting members comprising a first connecting portion and a second connecting portion, the first connecting portion connected to each of the levers, the second connecting portion connected to the shaft, the second connecting portion comprising a second engaging tooth engaged with the first engaging tooth, wherein each of the pivoting members comprises a limited block, and each of the connecting members comprises a receiving groove, the limited block is inserted into the corresponding receiving groove.

9. The stand as claimed in claim 8, wherein the first engaging tooth is securely engaged with the second engaging tooth by a force pressing on each of the connecting members and the pivoting members.

10. The stand as claimed in claim 9, further comprising a pair of elastic members, wherein each of the elastic members is placed over the shaft and sandwiched between the corresponding pivoting member and the shaft, and the first engaging tooth is securely engaged with the second engaging tooth by an elastic restoring forces of each of the elastic members.

11. The stand as claimed in claim 9, wherein the first engaging tooth is securely engaged with the second engaging tooth by an elastic restoring force of each of the levers.

12. The stand as claimed in claim 8, wherein a cutout and a threaded hole are formed in an end of each of the levers, a block is arranged in the first connecting portion of each of the connecting members, and the block is inserted into the cutout and prevents each of the levers rotating in the first connecting portion.

13. The stand as claimed in claim 8, wherein each of the clamping arms comprises a pole and a retaining pad arranged at one end of the pole, the retaining pads are adapted for sandwiching the chassis therebetween, and a free end of the pole is attached to the linking portion of the corresponding pivoting member.

14. The stand as claimed in claim 8, wherein a cutout and a threaded hole are formed in the other end of the pole, a block is arranged in the linking portion of each of the pivoting members, and the block is inserted into the cutout and prevents the clamping arm rotating in the linking portion.

15. The stand as claimed in claim 8, wherein the shaft comprises a stopping portion in a middle thereof and two inserting portions in two ends thereof, and a diameter of each of the inserting portions is smaller than that of the stopping portion, each of the inserting portions inserted into the second connecting portion of the corresponding connecting member.

16. An assembly comprising:

an electronic device of said assembly; and a stand installable next to said electronic device in order for supporting said electronic device along a preset orientation thereof, said stand comprising a base frame adapted to support said electronic device along a first side thereof, and at least one arm movably attachable to said base frame and adapted to supportively engage with a second side of said electronic device other than said first side thereof in order for contributing to maintaining said electronic device at said orientation thereof, said at least one arm movable along said second side of said electronic device to maintain supportive engagement thereof with said second side under a condition of restorably moving along a direction intersecting with said second side of said electronic device, wherein said restorably moving along said direction intersecting with said second side of said electronic device is performed by a pivoting member installable to an end of said at least one arm and a connecting member installable to said base frame, said pivoting member is movable to engage with said connecting member along said direction; the base frame comprises a shaft connecting with the pivoting member and the connecting member, an elastic member is placed over the shaft and sandwiched between the pivoting member and a raised portion of the shaft.

17. The assembly as claimed in claim 16, wherein the pivoting member comprises a plurality of first engaging teeth, and the connecting member comprises a plurality of second engaging teeth engagable with the first engaging teeth of the pivoting member.

18. The stand as claimed in claim 6, wherein the retaining pad is a rubber sucker capable of being stuck to a sidewall of the chassis.

\* \* \* \* \*